(12) United States Patent
Belmonte et al.

(10) Patent No.: US 6,207,120 B1
(45) Date of Patent: *Mar. 27, 2001

(54) CATALYTIC VENT GAS TREATMENT SYSTEM FOR ABATEMENT OF VOLATILE CHEMICAL EMISSIONS

(75) Inventors: Frank G. Belmonte, Norwood; Kenneth J. Abrams, Naperville, both of IL (US); Judith P. Oppenheim, Pensacola, FL (US)

(73) Assignee: BP Amoco Corporation, Chicago, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/872,277

(22) Filed: Jun. 10, 1997

Related U.S. Application Data

(63) Continuation-in-part of application No. 08/467,177, filed on Apr. 6, 1995, now abandoned.

(51) Int. Cl.[7] ............... B01D 47/00; B01J 8/00
(52) U.S. Cl. ............ 423/210; 423/240 R; 423/240 S; 423/245.1; 423/245.2; 423/245.3; 423/246; 423/247; 423/248
(58) Field of Search ............ 423/240 S, 245.3, 423/210, 240 R, 245.1, 245.2, 246, 247, 248

(56) References Cited

U.S. PATENT DOCUMENTS

| | | |
|---|---|---|
| 2,946,651 | 7/1960 | Houdry . |
| 3,455,089 | 7/1969 | Mattia . |
| 3,593,969 | 7/1971 | Smithson et al. . |
| 3,845,191 | 10/1974 | Bruce, Jr. . |
| 3,939,079 | 2/1976 | Uchiyama et al. . |

(List continued on next page.)

FOREIGN PATENT DOCUMENTS

| | | |
|---|---|---|
| 3936744 | 5/1991 | (DE) . |
| 407210 | 1/1991 | (EP) . |
| 485787 | 5/1992 | (EP) . |
| 1485375 | 9/1977 | (GB) . |
| 9013352 | 11/1990 | (WO) . |

OTHER PUBLICATIONS

Thomas G. Otchy and Keith J. Herbert, "First Large Scale Catalytic Oxidation System for PTA Plant CO and VOC Abatement," Air & Waste Management Association 85th Annual Meeting & Exhibition—Kansas City, Missouri, Jun. 21–26, 1992.

*Primary Examiner*—Steven P. Griffin
*Assistant Examiner*—Eileen E. Nave
(74) *Attorney, Agent, or Firm*—Thomas E. Nemo; Anthony R. Chi

(57) ABSTRACT

An integrated process for vent gas treatment for the abatement of volatile emissions is disclosed. The vent gas comprises dioxygen, carbon monoxide, hydrocarbons and other organic compounds comprising one or more alkyl halide compound of 1 to 5 carbon atoms. In the preferred embodiment, the vent gas is heated and mixed with an amount of combustible fluid. Then the mixture is directed to a catalytic oxidation reactor having a suitable oxidation catalyst disposed therein, wherein the mixture is catalytically oxidized. The effluent from the catalytic oxidation reactor is directed to heat the incoming vent gas and subsequently to a scrubber wherein the effluent is scrubbed of soluble compounds and the resultant treated gas stream is vented. Importantly, the amount of combustible fluid supplied to the vent gas stream is controlled so at to provide sufficient reactants for the catalytic oxidation to maintain reaction temperatures from 200° C. and 600° C.

20 Claims, 1 Drawing Sheet

U.S. PATENT DOCUMENTS

| | | |
|---|---|---|
| 4,059,675 | 11/1977 | Yang et al. . |
| 4,059,676 | 11/1977 | Yang et al. . |
| 4,059,677 | 11/1977 | Sare et al. . |
| 4,322,387 | 3/1982 | Virk et al. . |
| 4,355,973 | 10/1982 | Bailey . |
| 4,359,862 | 11/1982 | Virk et al. . |
| 4,359,863 | 11/1982 | Virk et al. . |
| 4,372,111 | 2/1983 | Virk et al. . |
| 4,388,892 | 6/1983 | Rody et al. . |
| 4,418,045 | 11/1983 | Sato et al. . |
| 4,857,499 | 8/1989 | Ito et al. . |
| 4,867,949 | 9/1989 | Betz . |
| 4,877,592 | 10/1989 | Matros et al. . |
| 4,966,611 | 10/1990 | Schumacher et al. . |
| 5,008,091 | 4/1991 | Bassi et al. . |
| 5,101,743 | 4/1992 | Hirschberg et al. . |
| 5,145,826 | 9/1992 | Hirschberg et al. . |
| 5,164,168 | 11/1992 | Bassi et al. . |
| 5,176,897 | 1/1993 | Lester . |
| 5,193,340 | 3/1993 | Kamihara . |
| 5,283,041 * | 2/1994 | Nguyen et al. .................. 423/240 S |
| 5,292,704 | 3/1994 | Lester . |
| 5,578,283 * | 11/1996 | Chen et al. ....................... 423/240 S |
| 5,607,496 * | 3/1997 | Brooks ................................. 423/210 |

* cited by examiner

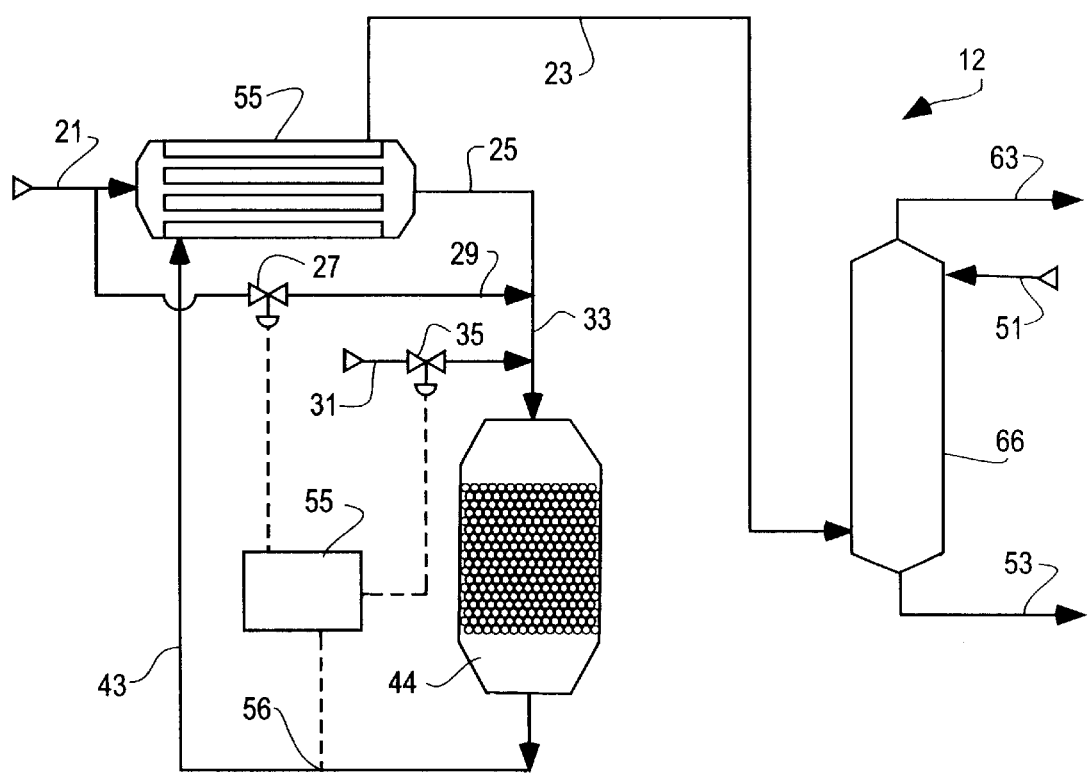

CATALYTIC VENT GAS TREATMENT SYSTEM FOR ABATEMENT OF VOLATILE CHEMICAL EMISSIONS

CROSS REFERENCE TO RELATED APPLICATION

This application is a continuation-in-part of application Ser. No. 08/467,177 filed Apr. 6, 1995, now abandoned, which application is specifically incorporated herein in its entirety by reference.

TECHNICAL FIELD

This invention relates to catalytic vent gas treatment systems for abatement of volatile chemical emissions. More particularly, the present invention relates to apparatus and methods for abatement of carbon monoxide and volatile organic compound emissions from industrial processes having a vent gas stream containing potential pollutants.

The instant invention provides vent gas treatments which include; oxidizing, simultaneously a selected combustible fluid dispersed in a vent gas stream and destroying a substantial fraction of the hazardous volatile organic compounds by oxidation over an oxidation catalyst at elevated temperatures, controlling the amount of combustible fluid being delivered to the vent gas stream so as to provide sufficient reactants for the catalytic oxidation to maintain a suitable range of reaction temperatures, cooling the oxidation effluent stream with the untreated vent gas steam, and passing the cooled oxidation effluent gas stream through a gas scrubbing tower.

Several aspects of this invention relate to processes for commercial manufacture of organic acids, particularly dibasic aromatic acids formed from a corresponding methyl substituted aromatic compound by liquid-phase oxidation of the methyl groups by contact with source of dioxygen, such as compressed air, in the presence of an oxidation catalyst system containing one or more compounds derived from a halogen. Integrated treatment systems according to this invention are, advantageously, used for abatement of carbon monoxide and volatile organic compound emissions from liquid-phase oxidation processes of forming aromatic acids.

Processes in accordance with this invention achieve, typically, destruction efficiencies for carbon monoxide in a range upward from about 90 percent to about 95 percent and higher, destruction efficiencies for hydrocarbons in a range upward from bout 80 percent to about 90 percent or greater. Processes using selected oxidation catalysts in accordance with this invention may, advantageously, achieve destruction efficiencies for alkyl halide compounds in a range upward from about 50 percent to about 85 percent or more.

BACKGROUND OF THE INVENTION

Both thermal and catalytic incineration is widely known and used for destruction of hazardous volatile organic compounds found in waste air and other gas streams which result from a variety of industrial processes. These streams result from processes for manufacture of organic chemicals and polymers, and from operations in which volatile organic solvents are used for cleaning and degreasing purposes in metal processing, machining and finishing. While catalytic incineration is able to operate at significantly lower temperatures and with considerably lower residence times than the thermal incineration alternative, additional equipment including a furnace and/or other heat exchange equipment have, typically, been required to provide a suitably elevated operating temperature to obtain catalytic activity for destruction of hazardous volatile organic compounds from a variety of industrial processes.

In any commercially viable application of catalytic incineration, special care is required in selection of an oxidation catalyst system appropriate to the volatile organic compounds which it is desired to destroy, and to avoid exposure of the selected catalyst to compounds which destroy its catalytic activity. Many of the gas streams which must be treated contain significant amounts of a halogen and/or halogenated compounds. However, precious metal catalysts used in conventional catalytic incineration are severely inhibited in their performance by the halogen atoms from the destruction of these compounds, and this desirable process cannot generally be used with such catalysts for these gas streams.

Recent and continuing interest in reduction of atmospheric pollution from internal combustion engines used in automotive and other vehicular applications is shown by numerous disclosures of apparatus for such intermittent operation. It is typically, stated that a reduction of atmospheric pollution and/or that some regulatory standard could be met using the disclosed apparatus. Achievement of significant improvement, however, may depend upon combination of any particular apparatus with modified engine designs and special fuels. Fuel quality improvements included, generally, both removal from the fuel composition of compounds which are known precursors of particular pollutants and blending with additional compounds which may change the composition of exhaust gases.

Recently issued U.S. Pat. No. 5,193,340 in the name of Tetsuya Kamihara and assigned to Nissan Motor Co. Ltd., is a representative of exhaust gas systems for internal combustion engine application. Most diesel engines are now equipped with a trap filter dispose in an exhaust passageway for trapping particulates and the like which are discharged from a diesel engine. When the back pressure of the engine increases due to the accumulation of the particulates trapped by the trap filter, the particulates are periodically burned to regenerate the trap filter. In the Kamihara apparatus the trap filter contains an oxidation catalyst for assisting burning of the particulates collected in the filter prior to regeneration. An injector valve is provided to inject diesel fuel into the exhaust passageway upstream of the trap filter, so that the trap filter is supplied with diesel fuel. The diesel fuel is burned in the trap filter under the action of the oxidation catalyst thereby burning the particulates so as to achieve a regeneration operation for the trap filter. When in operation, the amount of diesel fuel injected is controlled to increase as an intake air amount supplied to the engine increases and to decrease as an exhaust gas temperature increases, to limit or avoid thermal damage to the trap filter. When the particulates are periodically burned to regenerate the trap filter, the back pressure of the engine due to the accumulation of the particulates trapped by the trap filter is decreased thereby preventing the pack pressure from affecting engine performance. Undisclosed amounts of increased gaseous pollutants are exhausting to the atmosphere from the system during regeneration operation due to the additional diesel fuel burned.

Additional methods for filtering combustible particles from exhaust gases and rejuvenating the filter bed and its catalyst section are, for example, described in U.S. Pat. No. 4,322,287, U.S. Pat. No. 4,359,862 and U.S. Pat. No. 4,372,111 in the names of Kashmir S. Kirk and Martin Alperstein, and U.S. Pat. No. 4,359,863 in the names of Kashmir S. Kirk and Robert B. Burns, all assigned to Texaco Inc.

An earlier example of catalytic incineration equipment in which a gas-permeable bed of solids adapted to exchange heat with a gas stream is alternately heated with hot effluent from a catalytic oxidation bed and cooled with gas flowing into the bed by periodically reversing the direction of gas flow through the beds is described in U.S. Pat. No. 2,946,651 in the name of Eugene J. Houdry and assigned to Oxy-Catalyst, Inc. In operation, the patent states that sufficient diesel oil was injected into the heated gas stream and vaporized and then catalytically oxidized on the catalytic bed being used to heat the bed of gas-permeable solids. The catalyst employed was in the form of pellets of activated alumina impregnated with 5 percent of copper and chromium oxides and 0.1 inch in size. The heat exchange bed was the same size pellets composed of a dense fused alumina (Corhart).

Additional methods using preheating and or reversing flow for catalytic cleaning of exhaust gases are, for example, described in U.S. Pat. No. 4,059,676 in the names of Kang Yang and James D. Reedy, and assigned to Continental Oil Company; U.S. Pat. No. 4,877,592 in the names of Jury S. Matros, Viktor A. Chumachenko, Ljudmila J. Zudilina, Alexandr S. Noskov and Evgeny S. Bugdan, and assigned to Institut Kataliza Sibirskogo Otdelenia Akademii Nauk SSSR; Spetsialnoe Konstruktorsko-Technologicheskoe Bjuro Katalizatorov S Optnym Zavodim; and in U.S. Pat. No. 4,966,611 in the names of John C Schumacher, Joesph C. McMenamin, Lawrence B. Anderson, Harold R. Cowles and Stephen M. Lord, and assigned to Custom Engineered Materials Inc.

Regardless of the apparatus and methods employed, each commercial use depends, to be successful, upon selection of an oxidation catalyst appropriate to the volatile compounds which it is desired to destroy and the active lifetime of the catalyst in that system. Useful catalyst life is often limited due to exposure of oxidation catalysts to compounds which destroy their catalytic activity. Historically, the presence significant amounts of a halogen and/or organic and inorganic halogenated compounds in many of waste gas streams which must be treated has prevented the use of catalytic oxidation as a control technology for this application. It is believed the presence of halogen and/or compounds derived from halogen, whether or not such compound are destroyed in the process, deteriorate and temporarily poison the performance of precious metal catalyst.

Catalysts containing a noble metal (platinum), optionally in combination with other metals, for burning combustibles are described in U.S. Pat. No. 3,378,334 in the name of Herman S. Bioch and assigned to Universal Oil Products Company. Hydrated metal oxide catalysts have also been described. For example, U.S. Pat. No. 4,059,677 in the names of Edward J. Sare and Jerome M Lavanish, and assigned to PPG Industries, Inc., teaches that a waste containing $C_2$–$C_4$ halogenated hydrocarbons, particularly unsaturated chlorinated hydrocarbons such as vinyl chloride, are incinerated in the presence of combination the hydrated oxides of manganese and cobalt. A supported catalyst system containing a Group VIII metal (platinum) is disclosed in U.S. Pat. No. 5,145,826 in the names of Eugene H. Hirschberg and George A. Huff, Jr., and assigned to Amoco Corporation. The disclosures of U.S. Pat. Nos. 3,378,334, 4,059,677 and 5,145,826 are specifically incorporated herein in their entirety by reference.

U.S. Pat. No. 5,292,704 in the name of George R. Lester and assigned to Allied-Signal Inc., teaches that a waste containing $C_1$ halogenated compounds that do not have any carbon-hydrogen bonds are incinerated to carbon dioxide and halo acids (HCl, HBr, etc.) in the presence of specific combinations of a noble metal (platinum, palladium and rhodium), active catalytic components of titania, vanadium oxide, tungsten oxide, and optionally an effective amount of water. The disclosure of U.S. Pat. No. 5,292,704 is specifically incorporated herein in its entirety by reference. Halo acids are, however, very corrosive pollutants.

GB Patent No. 1,485,375 in the name of Goeffrey Colin Bond describes a process for degradation of a chlorinated hydrocarbon, in particular compounds containing more chlorine atoms than hydrogen atoms, by passing the chlorinated hydrocarbon into a bed of catalyst in which a fuel is "flamelessly" burning. In the Bond patent the term "degradation of a chlorinated hydrocarbon" is limited to formation of carbon dioxide and hydrogen chloride. The fact that exhaust gases from the degradation of a chlorinated hydrocarbon can also contain molecular chlorine is not mentioned. While scrubbing exhaust gases with water to remove the HCl is suggested in Bond, such scrubbing has not been found effective to remove all molecular halogens.

European Patent Application No. 0 485 787 A1 in the names of Masahiro Tajima and Masashi Harada describes treatment equipment of exhaust gas containing organic halogen compounds including a wash tower for removing hydrogen halide gas generated. Moreover, the patent states that in the case of decomposing the organic halogen compounds, the oxidative decomposition by oxygen most often generates halogen gas and the halogen gas generated is more difficult to remove than halogen halide. Without suggesting any direct method to remove halogen gas generated, the patent states that the existence of steam in the reaction gas may preferentially produce hydrogen halide.

It is therefore a general object of the present invention to provide improved apparatus and methods which overcome the aforesaid problems of prior art methods for abatement of carbon monoxide and volatile organic compound emissions from a from an industrial unit having a vent gas stream containing dioxygen, carbon monoxide, hydrocarbons and other organic compounds comprising one or more alkyl halide compound of 1 to 5 carbon atoms.

More particularly, it is an object of the present invention to provide integrated catalytic vent gas treatment systems for abatement of hazardous emissions from industrial processes using volatile chemicals.

It is another object of the present invention to provide integrated catalytic vent gas treatment systems that reduces air pollution by achieving reduced vent gas particulate levels emitted to the atmosphere.

It is another object of the present invention to provide integrated catalytic vent gas treatment systems that achieves reduced carbon monoxide and levels of potential pollutants at lower operating temperatures.

It is another object of the present invention to provide integrated catalytic vent gas treatment systems that achieves increased fuel efficiency and reduced fuel requirements while controlling carbon monoxide and levels of potential pollutants.

It is yet another object of the present invention to provide integrated catalytic vent gas treatment systems that extends incinerator equipment life, reduces maintenance costs, and reduces the frequency and duration of facility downtime.

It is yet another object of the present invention to provide integrated catalytic vent gas treatment systems with reduced energy costs.

While the above objects can be attained by integrated catalytic vent gas treatment systems according to this invention, other objects and advantages of the invention will become apparent upon reading the following detailed description and appended claims.

SUMMARY OF THE INVENTION

Economical treatment systems are disclosed for abatement of carbon monoxide and volatile organic compound emissions from chemical processes having a vent gas stream containing potential pollutants and excess dioxygen. Processes according to this invention include, broadly, dispersing into the vent gas stream a controlled amount of a pre-selected combustible fluid, simultaneously oxidizing the combustible fluid and destroying a substantial fraction of the organic pollutants by oxidation over an oxidation catalyst at elevated temperatures, controlling the amount of combustible fluid being delivered to the vent gas stream so as to provide sufficient reactants for the catalytic oxidation to maintain a suitable range of reaction temperatures. Vent gas treatment according to the instant invention includes, advantageously, a gas to gas heat exchanger, disposed in both the oxidation effluent stream from the oxidation vessel and the untreated vent gas stream to transfer heat therebetween, and the cooled stream passes through a gas scrubber disposed in the oxidation effluent down stream of the gas to gas heat exchanger.

In broad aspect, the invention is a vent gas treatment system for abatement of carbon monoxide, volatile hydrocarbon and other volatile compound emissions from a chemical process plant having a vent gas stream containing potential pollutants and excess dioxygen. More particularly, a system includes; an oxidation vessel, containing a solid oxidation catalyst, disposed in the vent gas stream; means for determining temperature of the vent gas stream upstream of the oxidation catalyst; means for supplying an amount of combustible fluid into the vent gas upstream of the oxidation pressure vessel to facilitate catalytic oxidation of the organic pollutants; means for determining temperature of the vent gas downstream of the oxidation catalyst; and means for controlling the amount of combustible fluid being delivered by the supplying means, the controlling means being arranged to provide sufficient reactants for the catalytic oxidation to maintain suitable reaction temperatures.

The invention includes processes for abatement of carbon monoxide, volatile hydrocarbon and alkyl halide compound emissions from a chemical process plant having a vent gas stream containing organic pollutants and excess dioxygen. Typically, processes according to the invention include; dispersing into the vent gas stream a controlled amount of combustible fluid where temperatures of the vent gas stream are in a range of temperature upward from about 25° C., typically in a range of temperature from about 30° C. to about 600° C.; oxidizing the combustible fluid and destroying a substantial fraction of the organic pollutants by oxidation over a selected solid oxidation catalyst at temperatures in a range upward from about 150° C., typically in a range from about 200° C. to about 600° C.; controlling the amount of combustible fluid being delivered to the vent gas stream so as to provide sufficient reactants for the catalytic oxidation to maintain a suitable range of reaction temperatures; cooling and/or scrubbing the effluent from the oxidation.

One class of suitable combustible fluids is, preferably, selected from the group consisting of hydrogen and organic compounds containing at least one oxygen atom per molecule, which organic compounds have a normal boiling point in a temperature range downward from about 200° C. to about −165° C., preferably in a temperature range downward from about 160° C. to about −50° C. and more preferably in a temperature range downward from about 130° C. to about 30° C.

In one aspect, the invention is a process for abatement of volatile chemical emissions from an industrial unit having a vent gas stream containing dioxygen, carbon monoxide, hydrocarbons and other organic compounds comprising one or more alkyl halide compound of 1 to 5 carbon atoms. In this aspect the treatment process comprises:

Dispersing a combustible fluid selected from the group consisting of carbon monoxide, hydrogen, $C_1$ to $C_5$ hydrocarbon compounds, $C_1$ to $C_5$ organic compounds containing at least one oxygen atom per molecule and mixtures thereof, into the vent gas stream;

Oxidizing the combustible fluid and destroying at least 90 percent of the carbon monoxide, at least 80 percent of the hydrocarbons, and at least 50 percent of the. alkyl halides in the vent gas stream in the presence of a solid oxidation catalyst which comprises at least one member of the group consisting of silica, alpha alumina, titania, silica alumina, zirconia and gamma alumina, and optionally at least one member of the group consisting of tungsten oxide, vanadium oxide, tin oxide, and the metals platinum, palladium and rhodium, Controlling the amount of combustible fluid being delivered to the vent gas stream so as to provide sufficient reactants for the catalytic oxidation to maintain suitable reaction temperatures in the range from 200° C. to 600° C. for the oxidation to form an oxidation effluent stream comprising unreacted dioxygen, carbon dioxide and water;

Cooling the oxidation effluent stream from the catalytic oxidation by passing, simultaneously, the oxidation effluent stream and the untreated vent gas stream through a gas to gas exchanger to transfer heat therebetween; and Contacting the cooled oxidation effluent gas stream with an aqueous medium comprising at least one member of the group consisting of lime, ammonia, sodium formate, sodium oxalate, sodium sulfide, urea and formaldehyde in a gas scrubbing tower to form a liquid solution of soluble compounds and a treated vent gas stream.

Processes according to the invention are, particularly, useful for treatment of is an effluent of an industrial unit which is forming an aromatic acid from a corresponding methyl substituted aromatic compound by catalytic liquid-phase oxidation of the methyl groups with excess dioxygen in the presence of a source of bromine, whereby the vent gas stream comprises an alkyl bromine compound of 1 to 5 carbon atoms.

In another aspect the invention is a process for abatement of volatile chemical emissions from an industrial unit which forms an aromatic acid from a corresponding methyl substituted aromatic compound by catalytic liquid-phase oxidation of the methyl groups with excess dioxygen in the presence of a source of bromine. In this aspect the treatment process comprises:

Dispersing a combustible fluid comprising at least one member of the group consisting of carbon monoxide, hydrogen, methanol, ethanol, 1-propanol, 2-propanol, 2-butanol and 2-methyl-2-propanol, into a vent gas stream containing dioxygen, carbon monoxide, hydrocarbons and other organic compounds comprising one or more alkyl bromide compound of 1 to 5 carbon atoms, at pressures in a range from atmospheric to about 300 psig;

Oxidizing the combustible fluid and destroying at least 90 percent of the carbon monoxide, at least 80 percent of the hydrocarbons, and at least 50 percent of the alkyl bromides in the vent gas stream in the presence of a solid oxidation catalyst which comprises at least one member of the group consisting of silica, alpha alumina, titania, silica alumina, zirconia and gamma alumina, and optionally at least one member of the group consisting of tungsten oxide, vanadium oxide, tin oxide, and the metals platinum, palladium and rhodium, Controlling the amount of combustible fluid being delivered to the vent gas stream so as to provide sufficient reactants for the catalytic oxidation to maintain suitable reaction temperatures in the range from 200° C. to 600° C. for the oxidation to form an oxidation effluent stream comprising unreacted dioxygen ($O_2$), carbon dioxide ($CO_2$), water ($H_2O$), hydrogen bromide (HBr) and/or dibromine ($Br_2$);

Cooling the oxidation effluent stream from the catalytic oxidation by passing, simultaneously, the oxidation effluent stream and the untreated vent gas stream through a gas to gas exchanger to transfer heat therebetween; and Contacting the cooled oxidation effluent gas stream with an aqueous medium comprising at least one member of the group consisting of lime, ammonia, sodium formate, sodium oxalate, sodium sulfide, urea and formaldehyde in a gas scrubbing tower to form a liquid solution of soluble compounds and a treated vent gas stream.

In yet another aspect the invention is a. process for abatement of volatile chemical emissions from an industrial unit which forms an aromatic acid from a corresponding methyl substituted aromatic compound by catalytic liquid-phase oxidation of the methyl groups with excess dioxygen in the presence of a source of bromine. In this aspect the treatment process comprises:

Dispersing a combustible fluid selected from the group consisting of carbon monoxide, hydrogen, methanol, butane and mixtures thereof, into a vent gas stream containing dioxygen, carbon monoxide, hydrocarbons and other organic compounds comprising methyl bromide, at pressures in a range from about 10 to about 300 psig;

Oxidizing the combustible fluid and destroying at least 95 percent or more of the carbon monoxide, 90 percent or more of the hydrocarbons, and 85 percent or more of the methyl bromide in the vent gas stream in the presence of a solid oxidation catalyst which comprises titania and at least one member of the group consisting of tungsten oxide, vanadium oxide, tin oxide, and the metals platinum, palladium and rhodium, Controlling the amount of combustible fluid being delivered to the vent gas stream so as to provide sufficient reactants for the catalytic oxidation to maintain suitable reaction temperatures in the range from 200° C. to 600° C. for the oxidation to form an oxidation effluent stream comprising unreacted dioxygen, carbon dioxide, water, hydrogen bromide and/or dibromine;

Cooling the oxidation effluent stream from the catalytic oxidation by passing, simultaneously, the oxidation effluent stream and the untreated vent gas stream through a gas to gas exchanger to transfer heat therebetween; and Contacting the cooled oxidation effluent gas stream with an aqueous medium comprising at least one member of the group consisting of sodium formate, sodium sulfide, urea and formaldehyde in a gas scrubbing tower to form a liquid solution of soluble compounds and a treated vent gas stream.

A more detailed explanation is provided in the following description and appended claims taken in conjunction with the accompanying figure.

BRIEF DESCRIPTION OF THE DRAWING

The appended claims set forth those novel features which characterize the present invention. The present invention itself, as well as advantages thereof, may best be understood, however, by reference to the following brief description of preferred embodiments taken in conjunction with the annexed drawing, in which:

THE figure is a simplified diagrammatic representation of a portion of an integrated process of vent gas treatment for abatement of carbon monoxide and volatile organic compound emissions from a chemical process plant, and includes provisions for catalytic oxidation of organic pollutants with dioxygen in a vent gas stream over a solid oxidation catalyst, means for supplying an amount of combustible fluid into the vent gas stream upstream of the oxidation pressure vessel to facilitate catalytic oxidation of the organic pollutants; and means for controlling the amount of combustible fluid being supplied by the supplying means, the controlling means being arranged to provide sufficient reactants for the catalytic oxidation to maintain suitable reaction temperatures in accordance with the present invention.

BRIEF DESCRIPTION OF THE INVENTION

Catalytic vent gas treatment systems for abatement of volatile chemical emissions according to this invention are, suitably, used for destruction of volatile organic compounds found in waste air and other gas streams involved with- a wide variety of industrial processes. Such streams result, for example, from processes for manufacture of organic chemicals and polymers, fabric coating, food processing, rubber fabrication operations, and from operations in which volatile organic solvents are used for coating, cleaning and/or degreasing purposes in metal processing, machining and finishing.

Several aspects of this invention relate to catalytic oxidation processes for commercial manufacture of organic acids and/or their anhydrides, particularly dibasic aromatic acids such as isophthalic acid, terephthalic acid, 2,6-naphthalene dicarboxylic acid, or anhydride such as trimellitic anhydride and the like. One or more compound derived from a halogen is, typically, a critical component of the oxidation catalyst system used for commercial manufacture of dibasic aromatic acids. Processes, for example, in which the vent gas stream comprises an effluent containing nitrogen, excess dioxygen, volatile hydrocarbon compounds and other organic compounds, such as volatile alkyl halide compounds, from a liquid-phase oxidation process of forming an aromatic acid from a corresponding methyl substituted aromatic compound by contact with source of dioxygen, such as compressed air, in the presence of an oxidation catalyst system at elevated pressures and temperatures. Integrated treatment systems according to this invention are, advantageously, used for abatement of carbon monoxide and volatile organic compound emissions from liquid-phase oxidation process of forming aromatic acids, such as isophthalic acid, terephthalic acid, 2,6-naphthalene dicarboxylic acid and other dibasic acids.

Vent gas streams suitable for treatment in the catalytic process of the present invention can comprise most materials that are combustible in the presence of oxygen at temperatures within the operating range of the catalytic device. These materials are generally, but not limited to, carbon monoxide, hydrogen, hydrocarbon compounds, and organic compounds containing other atoms such as oxygen, nitrogen, halogens and the like. Generally, potential pollutants include volatile compounds, such as alkanes, alkenes, alcohols, ethers, aldehydes (alkanals), ketones (alkanones), organic acids and mixtures thereof, which form vapors found in a vent gas stream.

Selection of combustible fluid is critical in order that its oxidation provide a substantial amount of the heat that is required to control operating conditions over the oxidation catalyst without deleterious effect on catalyst activity. Advantageously, compounds in the combustible fluid should be in the vapor state at operating conditions. Suitable combustible fluids comprise carbon monoxide, hydrogen, hydrocarbon compounds, and organic compounds containing at least one oxygen atom per molecule. Generally, organic compounds useful as combustible fluids according to this invention consists of compounds, such as alkanes, alkenes, alcohols, ethers, aldehydes (alkanals), ketones (alkanones), organic acids and mixtures thereof, which have normal boiling points in a temperature range downward from about 200° C. to about −165° C., preferably in a temperature range downward from about 160° C. to about −50° C. and more preferably in a temperature range downward from about 130° C. to about 30° C. Suitable combustible fluid comprises a member of the group consisting of carbon monoxide, hydrogen, $C_1$ to $C_5$ hydrocarbon compounds, $C_1$ to $C_5$ organic compounds containing at least one oxygen atom per molecule and mixtures thereof, preferably at least one member of the group consisting of carbon monoxide, dihydrogen ($H_2$), methanol, ethanol, 1-propanol, 2-propanol, 2-butanol and 2-methyl-2-propanol.

Examples of useful combustible fluids include propane, butane, pentane, ethene (ethylene), propene (propylene), 1-butene (α-butylene), 2-butene (β-butylene), methylpropene (isobutylene), 1-pentene (α-amylene), 2-Pentene, 2-methyl-1-butene, 2-methyl-2-butene, methanol, ethanol, 1-propanol, 2-propanol, 1-butanol, 2-butanol, 2-methyl-1-propanol (isobutyl alcohol), 2-methyl-2-propanol (tert-butyl alcohol), methoxymethane (dimethyl ether), methoxyethane (methyl ethyl ether), ethoxyethane (diethyl ether), 1-methoxypropane (methyl n-propyl ether), 2-methoxypropane (methyl isopropyl ether), 1-methoxybutane (methyl n-butyl ether), methanal (formaldehyde), ethanal (acetaldehyde), propanal (propionaldehyde), butanal (n-butyraldehyde), methylpropanal (isobutyraldehyde), pentanal (n-valeraldehyde), dimethylpropanal (pivaldehyde), propanone (acetone), butanone (methyl ethyl ketone), 3-pentanone (diethyl ketone), 2-pentanone (methyl n-propyl ketone), methane, ethane, and mixtures thereof.

For safe operation the amount of organic compounds in the waste air or vent gas streams should, generally, be substantially below the lower explosive limit (LEL) at operating conditions, preferably in a range downward from about 50 percent of the LEL, and more preferably below about 25 percent of the LEL. The composition of the gas streams is, typically, monitored by on-line analysis equipment for safe operation, while controlling the amount of combustible fluid being delivered to the vent gas stream so as to provide sufficient reactants for the catalytic oxidation to maintain a suitable range of reaction temperatures.

The range of total reactor pressure useful in this invention runs between sub-atmospheric and about 1000 psig, preferably between sub-atmospheric and about 600 psig, more preferably between atmospheric and about 300 psig, and most preferably from about 10 psig to about 200 psig.

Vent gas treatments in accordance with the present invention, include contacting the waste gas stream with a catalyst in the presence of excess oxygen at suitable temperatures which are, typically, in a range downward from about 600° C. Operations of the present invention are, advantageously, carried out at inlet temperatures to the oxidation catalyst in a range downward from about 550° C. to about 50° C., depending upon the composition of the waste gas stream and the nature of a particular catalyst system. Catalysts do not alter the reaction product composition at equilibrium, but can accelerate the reactants toward their equilibrium at lower energy levels (lower operating temperatures). While a true catalyst is not consumed in the reaction, catalysts may be poisoned or deactivated by the presence of particular compounds in the waste gas stream or severe operating conditions.

The range of useful volume hour space velocities run between about 100 $hr^{-1}$ and about 200,000 $hr^{-1}$, preferably between about 1000 $hr^{-1}$ and about 50,000 $hr^{-1}$, based upon volume of catalyst.

In accordance with the present invention, the oxidation catalyst comprises a combustion promoting metal deposed on a catalyst support. Base metal catalysts can be used for treatment of waste streams containing CO and/or organic compounds which have a high relative destructibility, such as alcohols, cellosolves, aldehydes and the like. In general, the higher the molecular weight of a particular class of organic compound, the higher its relative destructibility. Nobel metal catalysts are, advantageously, used for treatment of waste streams containing organic compounds which have lower relative destructibility, such as aromatics, ketones, acetates, alkanes, halogenated hydrocarbons and the like.

In the instant invention the catalyst can be used in any convenient configuration, shape or size which exposes the oxidation promoting components of the catalyst to the gas stream to be treated. For example, catalyst can be in the form of pills, pellets, granules, rings, spheres, etc. Particulate forms are especially desirable where large volumes of catalysts are needed, an for use in circumstances in which periodic replacement of the catalyst may be desired. In circumstances in which less mass is desirable or in which movement or agitation of particles of catalyst may result in attrition, dusting and resulting loss of dispersed metal or undue increase in pressure drop across the particles, a monolithic form is preferred. In accordance with the present invention, catalysts are, typically, used in a pelleted or monolithic form.

The support for the oxidation catalyst can be less catalytically active or even inert to the oxidation reaction. Desirably, the support is porous and has a surface area, including the area of the pores on the surface, of at least from about 25 $m^2/gm$ to about 250 $m^2/gm$, preferably from about 50 $m^2/gm$ to about 200 $m^2/gm$, and more preferably from about 80 $m^2/gm$ to about 150 $m^2/gm$ for best results. Suitable supports for use in the present invention include mullite, spinel, sand, silica, alumina, silica alumina, titania, zirconia, alpha alumina, gamma alumina, delta alumina, and eta alumina. Supports comprising alpha alumina, gamma alumina, silica, or silica alumina are preferred. Supports comprising alpha alumina or gamma alumina are more preferred.

The support component of the oxidation catalyst may be pure or a composite of materials. Composite supports are advantageous where there is a desire to add particular chemical or physical characteristics to the catalyst. For example, the oxidation catalyst can comprise a substrate and a substrate coating in order to attain the particular benefits of both, substrate materials having high attrition resistance and substrate coating materials having high surface area. The substrate and substrate coating can be combined through conventional impregnation techniques. Suitable materials for use as a composite substrate for the oxidation catalyst are mullite, spinel, alpha alumina, and sand. Alpha alumina is the preferred composite substrate. Suitable materials for use as a composite substrate coating are silica, alumina, titania, silica alumina, zirconia, alpha alumina, gamma alumina, delta alumina, and eta alumina. Composite substrate coatings comprising silica, titania, silica alumina, and gamma alumina are preferred. Composite substrates comprising gamma alumina are more preferred.

The combustion promoting metal of the process of the present invention can be the types used or generally known in the art to promote the oxidation of carbon monoxide to carbon dioxide in the presence of molecular oxygen. The metal can be in a combined form, such as an oxide, rather than being in the elemental state. The combustion promoting metal can comprise two or more catalytically-active metals either physically or chemically combined. Suitable combustion promoting metals for use in the process of the present invention are the transition group elements of the Periodic Table (IUPAC), preferably the Group VIII metals, more preferably the precious metals, and more preferably yet, platinum and palladium. Platinum is preferred by reason of its ability to sustain high activity for oxidation of carbon monoxide.

The percentage of combustion promoting metal to add to the oxidation catalyst used in the present invention is a function of catalyst cost and process effectiveness. The preferred concentration of promoter metal is that which achieves process objectives at minimum catalyst cost. Generally, the combustion promoting metal is a costly component of the oxidation catalyst. Higher metal concentrations and lower volume usage reduces the support and oxidation catalyst costs. Suitable metal concentrations on the combustion promoter catalyst of the present invention can range by weight from about 0.1 ppm at about 15,000 ppm, preferably from about 0.5 ppm to about 10,000 ppm, and more preferably from about 1 ppm to about 8,000 ppm for best results.

A platinum group component can be incorporated in the support in any suitable manner , such as by coprecipitation or cogellation with the support, ion-exchange, or by impregnation. Preferably, the platinum group component is substantially uniformly disposed on the support. One preferred method for adding the platinum group component to the support involves the utilization of a water soluble compound of the platinum group component to impregnate the support prior to calcination. For example, platinum may be added to the support by commingling the uncalcined support with an aqueous solution of chloroplatinic acid. Other water soluble compounds of platinum may be employed as impregnation solutions, including for example, ammonium chloroplatinate and platinum chloride.

The oxidation catalyst used in the present invention should have the proper physical characteristics for use in fixed bed oxidation. The most important physical characteristics in the practice of the present process are pressure drop across the catalyst and resistance to attrition.

Several particularly useful waste gas oxidation catalysts have been described. For example, U.S. Pat. No. 3,378,334, the disclosure of which is specifically incorporated herein in its entirety by reference, describes a fixed bed of spherical catalyst particles containing up to about 5 percent of a catalytically active metal such as platinum, palladium, iridium, ruthenium, rhodium, various mixtures including platinum-iron, platinum-cobalt, platinum-nickel, palladium-iron, palladium-cobalt, palladium-nickel, platinum-palladium, palladium-copper-cobalt, platinum-copper-lithium-cobalt platinum-cobalt-copper, copper-cobalt-nickel-platinum, platinum-palladium-cobalt, manganese-platinum, platinum-cobalt-manganese, lithium-platinum-cobalt, copper-cobalt-lithium, etc. These oxidation catalysts are generally constituted in a manner similar to other hydrocarbon conversion catalysts in that they comprise a high surface area refractory inorganic oxide base or support such as alumina, alumina-silica, alumina-zirconia, etc. upon which are deposited by precipitation or impregnation techniques, one or more activating components, i.e., catalytically active metals or metal oxides. Particularly desirable activating component for burning combustible gases are the metals of the platinum family, especially platinum and palladium; these show excellent conversion activity for carbon monoxide, hydrocarbons, and oxygenated hydrocarbons over prolonged periods of time.

Suitable catalysts containing ruthenium, ruthenium plus platinum and platinum dispersed on a non-oxidizing support are described respectively in U.S. Pat. Nos. 4,059,675, 4,059,676 and 4,059,683, the disclosures of which are specifically incorporated herein in their entirety by reference. The first patent teaches use of 0.01 to 1.0 weight percent ruthenium on a non-oxidizing support for decomposing chlorinated hydrocarbon compounds containing up to 4 carbon atoms and containing at least as many hydrogen atoms as chlorine atoms at temperatures of at least about 350° C. The second patent teaches use of a bimetallic catalyst wherein both finely divided metallic ruthenium and a noble metal, i.e. 1 to 20 parts of finely divided metallic platinum per part of ruthenium, are supported on a nonoxidizing support for decomposing chlorinated hydrocarbon compounds containing up to 4 carbon atoms and containing at least as many hydrogen atoms as chlorine atoms at temperatures of at least about 350° C. Chlorinated compounds which are decomposed include vinyl chloride and mixtures of $C_1$ chlorinated compounds and $C_2$ chlorinated compounds containing vinyl chloride having a total number of hydrogen atoms in the mixture at least equal to the total number of chlorine atoms. Oxidation products $CO_2$, $H_2O$, HCl, and $Cl_2$ are produced using these catalysts.

Suitable catalysts containing (a) iron dispersed on an alumina support and a rare earth metal, particularly oxides of iron and praseodymium, and (b) an intermediate oxide of tungsten in which the average valence state of the tungsten radical is greater than 4 and less than 6, are described in U.S. Pat. No. 4,610,975, the disclosure of which is specifically incorporated herein in its entirety by reference.

Catalysts containing palladium and/or platinum and at least three promoter components carried on a porous support are described in U.S. Pat. No. 4,857,499, the disclosure of which is specifically incorporated herein in its entirety by reference. The first promoter component includes one of the rare earth elements such as lanthanum, cerium, praseodymium and neodymium, alkaline earth metals such as barium, strontium and calcium, and oxides thereof, the second promoter component includes magnesium, silicon and oxides thereof, and the third promoter component includes one of the heavy metals such as nickel, zirconium, cobalt, iron and manganese and oxides thereof.

More recently, particularly useful catalysts containing titania and optionally tungsten oxide, vanadium oxide, tin oxide and the noble metals platinum, palladium, and rhodium are described in U.S. Pat. No. 5,176,897, the disclosure of which is specifically incorporated herein in its entirety by reference, for use with an effective amount of water to convert halogen containing organic compounds to carbon dioxide and the corresponding halo acid.

The following examples will serve to illustrate certain specific embodiments of the herein disclosed invention. These examples should not, however, be construed as limiting the scope of the novel invention, as there are many variations which may be made thereon without departing from the spirit of the disclosed invention, as those of skill in the art will recognize.

EXAMPLES OF THE INVENTION

General

In the following examples, simultaneous oxidation of combustible fluids and destruction of substantial fractions of potentially hazardous volatile organic compounds by oxidation over an oxidation catalyst at elevated temperatures were carried out using a small cylindrical reactor (¾ inch. ID, 6 inch L) adapted to contain a supported catalyst bed. External surfaces were heated via electric heaters. Internal surfaces of the reactor were made of materials which exhibited no catalytic activity under various operating conditions used in these examples. thermocouples were located throughout the apparatus, particularly in the reactor just above and below the catalyst bed. Combustible fluid and simulated vent gas were continuously metered and passed through a static mixer upstream of the reactor. Temperatures of gaseous mixtures entering the reactor were, typically, about 200° C. Concentrations of organic compounds in reactor feed and effluent gases were determined by gas chromatograph using flame ionization detection. Concentrations of carbon monoxide and carbon dioxide were measured using infrared analyzers. Oxygen concentrations were measured with an electrochemical analyzer. Unless otherwise noted, gas compositions are in percent by volume and parts per million by volume (ppmv).

Example 1

In this example, a series of vent gas treatments was carried out according to this invention using methanol as the combustible fluid with a precious metal volatile organic compound destruction catalyst in the form of, or supported on, ceramic monolith.

The gaseous mixtures entering the reactor had compositions of about 4.3 percent oxygen, 0.35 percent carbon monoxide, 1.2 percent carbon dioxide, 0.77 percent water, from about 1 ppmv to about 1,000 ppmv each of methyl acetate, methyl bromide, methyl formate, benzene, toluene, p-xylene and acetic acid, from about 3,000 ppmv to about 14,000 ppmv methanol and a balance of nitrogen.

At reactor temperatures in a range from about 415° C. to about 510° C. and space velocity of about 10,000. hr$^{-1}$ (gas flow rate at standard conditions/catalyst volume), conversions of carbon monoxide, methyl acetate, methyl bromide, methyl formate, benzene, toluene, p-xylene and acetic acid were in a range upward from about 97 percent. At reactor temperatures in a range from about 310° C. to about 510° C. and space velocity of about 10,000 hr$^{-1}$ conversions of methanol were in a range upward from about 99 percent. Analysis of reactor effluent for combustion produces found carbon dioxide, water elemental bromine ($Br_2$) and hydrogen bromide (HBr). Intermediate oxidation compounds, which could be detected at concentrations above about 1 ppmv, were not detected. Throughout these runs, no deleterious effect on activity of the catalyst was observed.

Comparative Example A

In this comparative example, a series of runs was carried out as in Example 1, but without catalyst and at very low methanol concentrations in a range from about 30 ppmv to about 60 ppmv based on total reactor fee d gas. Under operating conditions used in Example 1, there was no significant oxidation of either the organic compounds or the carbon monoxide in reactor feed gas, even at reactor temperatures up to about 550° C.

Comparative Example B

In this comparative example, a series of runs was carried out as in Example 1, but without addition of any combustible fluid addition to the reactor feed gas and at very low methanol concentrations in a range from about 30 ppmv to about 35 ppmv based on total reactor feed gas. Temperature of the catalyst bed was controlled by heating with the external electric heaters.

The gaseous mixtures entering the reactor had composition s of about 4.3 percent oxygen, 3500 ppmv carbon monoxide, 11500 ppmv carbon dioxide, from about 1 ppmv to about 1,000 ppmv each of methyl acetate, methyl bromide, methyl formate, benzene, toluene, p-xylene and acetic acid, and a balance of nitrogen.

At reactor pressures in a range from about 145 psig to about 150 psig and reactor temperatures in a range upward from about 438° C. and space velocity of about 10,600 hr$^{-1}$, conversions of carbon monoxide, methyl acetate, methyl bromide, methyl formate, benzene, toluene, p-xylene and acetic acid were in a range upward from about 95 percent. At reactor temperatures in a range upward from about 494° C. conversions were in a range upward from about 98 percent.

Comparative Example C

In this comparative example a series of vent gas treatments was carried out as in Example 1, but using hexane as the combustible fluid with a non-noble metal volatile organic compound destruction catalyst in granular form.

The gaseous mixtures entering the reactor had compositions of about 5.8 percent oxygen, 2.0 percent water, from about 1 ppmv to about 1,000 ppmv each of methyl bromide and methanol, from about 4,000 ppmv to about 5,000 ppmv hexane and a balance of nitrogen.

At reactor temperatures in a range from about 415° C. to about 510° C., reactor pressure of about 120 psig, and space velocity of about 10,000 hr$^{-1}$ (gas flow rate at standard conditions/catalyst volume), conversions of methyl bromide, methanol and hexane were, respectively, about 91 percent, 92 percent and 99.8 percent as determined by decreases in their concentration across the reactor. Analysis of reactor effluent for combustion produces found carbon dioxide, carbon monoxide, water elemental bromine ($Br_2$) and hydrogen bromide (HBr). However, about 10 ppmv of benzene was found in reactor effluent gas. It is believed likely the benzene formed from hexane. Bromobenzenes were also detected in effluent gas, which can be formed by reaction between benzene and bromine ($Br_2$). When hexane was present in the reactor feed gas at levels suitable for combustible fluids, formation of benzene and bromobenzenes made hexane unsuitable as a combustible fluid.

BRIEF DESCRIPTION OF PREFERRED EMBODIMENTS

While this invention is susceptible of embodiment in many different forms, this specification and accompanying drawing disclose only some specific forms as an example of the use of the invention. In particular preferred embodiments of the invention for treatment of vent gas from a catalytic liquid phase oxidation process using compressed air are illustrated and described. The invention is not intended to be limited to the embodiments so described, and the scope of the invention will be pointed out in the appended claims.

The apparatus of this invention is used with certain conventional components the details of which, although not fully illustrated or described, will be apparent to those having skill in the art and an understanding of the necessary function of such components.

More specifically with reference to the figure, the integrated vent gas treatment system 12 comprises: one or more oxidation vessels, illustrated as oxidation vessel 44 containing a suitable solid oxidation catalyst; vent gas heater, illustrated as exchanger 22; means to control temperature of effluent from the oxidation catalyst, illustrated as controller 55; and quench and/or scrubbing units, illustrated as tower 66.

During operation of the system a vent gas stream containing volatile compounds and excess dioxygen, for example from a catalytic liquid phase oxidation process using compressed air, flows via conduit 21 into heat exchanger 22 where the vent gas stream is heated to at least a minimum catalytic conversion temperature. The heated gas stream is transferred from exchanger 22 through conduit 25 and manifold 33 into oxidation vessel 44. Any suitable portion of the vent gas stream can be diverted from conduit 21 through control valve 27 and conduit 29 into manifold 33 in order to limit temperatures in the solid oxidation catalyst. Heat is supplied to heat exchanger 22 by effluent from oxidation vessel 44 through conduit 43. Controller 55 monitors temperature of the effluent with sensor 56. When control valve 27 is closed, i.e. no vent gas by-passing heat exchanger 22, but temperature of the effluent is below a pre-determined level, a controlled amount of combustible fluid is admixed into the heated vent gas stream from storage (not shown) via conduit 31 and flow control valve 35. Means for controlling the amount of combustible fluid being supplied is arranged to provide sufficient reactants for the catalytic oxidation to maintain suitable reaction temperatures in oxidation vessel 44.

Nitrogen content of a suitable vent gas stream is, typically, more than about 90 percent by volume. Dioxygen content is less than 10 percent, preferably in a grange from about 1 to about 7.5 percent. Carbon oxides and water vapor together are less than about 7.5 percent, typically less than about 5 percent. Levels of organic pollutants in the vent gas stream are, advantageously, substantially below the lower explosive limit at operating conditions, preferably less than about 50 percent of the lower explosive limit.

Temperatures of the heated vent gas stream are in a range upward from about 150° C., generally, in a range from about 200° C. to about 600° C., preferably, in a range from about 325° C. to about 575° C., and more preferably, in a range from about 350° C. to about 500° C.

The amount of combustible fluid can be controlled manually using conventional process instrumentation such as thermo-couples to measure at least temperature of the vent gas stream upstream of the oxidation catalyst and temperature of the vent gas downstream of the oxidation catalyst and, optionally, process flow rates and gas stream compositions. However, automatic process control equipment is, advantageously, adapted for controlling the amount of combustible fluid being supplied is arranged to provide sufficient reactants for the catalytic oxidation to maintain suitable reaction temperatures in oxidation vessel 44, and to limit the total amount of organic compounds in the gas to levels substantially below the lower explosive limit (LEL) at operating conditions, preferably in a range downward from about 50 percent of the LEL, and more preferably below about 25 percent of the LEL.

Using selected oxidation catalysts under suitable operating conditions, even halo-organic compounds are, advantageously, destroyed. In particular, methyl bromide is destroyed forming hydrogen bromide and/or bromine.

Temperatures of hot effluent gas from oxidation vessel 44 are in a range upward from about 200° C., generally, in a range from about 300° C. to about 600° C., preferably, in a range from about 325° C. to about 550° C., and more preferably, in a range from about 350° C. to about 500° C. Hot effluent gas from oxidation vessel 44 is transferred through conduit 43 and 45 into exchanger 22, where it is cooled by heat exchange to incoming vent gas. Effluent gas from exchanger 22 is transferred through conduit 23 into the bottom of tower 66 were the gas stream is quenched and scrubbed. A suitable aqueous solvent is fed into tower 66 through liquid feed line 51.

Generally, the aqueous solvent comprises dilute solution of a chemical base, i.e., a substance that in aqueous solution increases the hydroxide ion concentration. The pH of these alkaline aqueous solutions is in a range upward from about 7, preferably in a range from about 7 to about 9. Where halogen containing compounds are present in the gas stream, the solvent may, advantageously, comprise additional compounds which react with halogen to enhance the scrubbing operation. Appreciably soluble oxides, oxalates, hydroxides, carbonates, sulfides, etc. of the alkali metals and of calcium, strontium, barium, and ammonium ion are, generally, useful compounds. Sources of useful compounds include industrial chemicals such as lime (CaO), ammonia ($NH_3$), ammonium oxalate [$(NH_4)_2C_2O_4$], ammonium hydroxide ($NH_4OH$), sodium hydroxide (NaOH), sodium carbonate ($Na_2CO_3$), sodium bicarbonate ($NaHCO_3$), sodium oxalate ($Na_2C_2O_4$), sodium formate ($NaCO_2H$), sodium sulfide (NaS), urea ($NH_2CONH_2$), formaldehyde (HCHO), and the like. Where compounds such as hydrogen chloride, chlorine, hydrogen bromide, and/or bromine are present in the gas stream, the aqueous solvent, advantageously, comprises dilute caustic, and/or at least one member of the group consisting of lime, ammonia, sodium formate, sodium oxalate, sodium sulfide, urea and formaldehyde, preferably at least one member of the group consisting of sodium formate, sodium oxalate, sodium sulfide, urea and formaldehyde, and more preferably at least one member of the group consisting of sodium formate, sodium oxalate, and sodium hydroxide.

A solution of soluble compounds is purged from the system via bottoms liquid line 53 to any suitable liquids/solids waste treatments. The treated gas stream is transferred from tower 66 through overhead line 63 to energy recovery and/or treatment for in plant uses, such as an inert carrier gas, or vented. Processes in accordance with this invention achieve, advantageously, levels of molecular halide, e.g. dibromine, in the treated vent gas of less than about 10 parts per million (ppm), preferably less than about 5 ppm, and more preferably about 1 ppm.

Processes in accordance with this invention achieve, typically, destruction efficiencies for carbon monoxide in a range upward from about 90 percent, preferably upward from about 95 percent or greater, efficiencies for hydrocarbons in a range upward from about 80 percent, preferably upward from about 90 percent or greater, and efficiencies for methyl bromide in a range upward from about 50 percent preferably upward from about 85 percent or more.

That which is claimed is:

1. A process for abatement of volatile chemical emissions from an industrial unit having a vent gas stream containing dioxygen, carbon monoxide, hydrocarbons and other organic compounds comprising one or more alkyl halide compound of 1 to 5 carbon atoms, the process comprising:

(A-1) Dispersing a combustible fluid selected from the group consisting of carbon monoxide, hydrogen, $C_1$ to $C_5$ hydrocarbon compounds, $C_1$ to $C_5$ organic compounds containing at least one oxygen atom per molecule and mixtures thereof, into the vent gas stream;

(B-1) Oxidizing the combustible fluid and destroying at least 90 percent of the carbon monoxide, at least 80 percent of the hydrocarbons, and at least 50 percent of the alkyl halides in the vent gas stream in the presence of a solid oxidation catalyst which comprises at least one member of the group consisting of silica, alpha alumina, titania, silica alumina, zirconia and gamma alumina, and optionally at least one member of the group consisting of tungsten oxide, vanadium oxide, tin oxide, and the metals platinum, palladium and rhodium, (C-1) Controlling the amount of combustible fluid being delivered to the vent gas stream so as to provide sufficient reactants for catalytic oxidation to maintain suitable reaction temperatures in the range from 200° C. to 600° C. for the catalytic oxidation to form an oxidation effluent stream comprising unreacted dioxygen, carbon dioxide and water;

(D-1) Cooling the oxidation effluent stream from the catalytic oxidation by passing, simultaneously, the oxidation effluent stream and untreated vent gas stream through a gas to gas exchanger to transfer heat therebetween; and (E-1) Contacting the cooled oxidation effluent gas stream with an aqueous medium comprising at least one member of the group consisting of lime, ammonia, sodium formate, sodium oxalate, sodium sulfide, urea and formaldehyde in a gas scrubbing tower to form a liquid solution of soluble compounds and a treated vent gas stream.

2. The process according to claim 1 wherein the vent gas stream is an effluent of an industrial unit which is forming an aromatic acid from a corresponding methyl substituted aromatic compound by catalytic liquid-phase oxidation of the methyl groups with excess dioxygen in the presence of a source of bromine, whereby the vent gas stream comprises an alkyl bromine compound of 1 to 5 carbon atoms.

3. The process according to claim 1 wherein the solid oxidation catalyst comprises titania and optionally at least one member of the group consisting of tungsten oxide, vanadium oxide, tin oxide, and the metals platinum, palladium and rhodium.

4. The process according to claim 1 wherein the catalytic oxidation is carried out at pressures in a range from about atmospheric to about 300 psig, and space velocities in a range from 1000 $hr^{-1}$ to 50,000 $hr^{-1}$ based upon gas flow rate at standard conditions and volume of catalyst.

5. The process according to claim 1 wherein the aqueous medium comprising at least one member of the group consisting of sodium formate, sodium oxalate, sodium sulfide, urea and formaldehyde.

6. The process according to claim 1 wherein the combustible fluid comprises at least one member of the group consisting of hydrogen, methanol and butane.

7. The process according to claim 1 wherein the silica, alpha alumina, titania, silica alumina, zirconia and/or gamma alumina is deposited on a ceramic or metallic honeycomb support.

8. The process according to claim 1 wherein the aqueous medium has values of pH in a range from 7 to 9.

9. A process for abatement of volatile chemical emissions from an industrial unit which forms an aromatic acid from a corresponding methyl substituted aromatic compound by catalytic liquid-phase oxidation of the methyl groups with excess dioxygen in the presence of a source of bromine, the process comprising:

(A-9) Dispersing a combustible fluid comprising at least one member of the group consisting of carbon monoxide, hydrogen, methanol, ethanol, 1-propanol, 2-propanol, 2-butanol and 2-methyl-2-propanol, into a vent gas stream containing dioxygen, carbon monoxide, hydrocarbons and other organic compounds comprising one or more alkyl bromide compound of 1 to 5 carbon atoms, at pressures in a range from atmospheric to about 300 psig;

(B-9) Oxidizing the combustible fluid and destroying at least 90 percent of the carbon monoxide, at least 80 percent of the hydrocarbons, and at least 50 percent of the alkyl bromides in the vent gas stream in the presence of a solid oxidation catalyst which comprises at least one member of the group consisting of silica, alpha alumina, titania, silica alumina, zirconia and gamma alumina, and optionally at least one member of the group consisting of tungsten oxide, vanadium oxide, tin oxide, and the metals platinum, palladium and rhodium, (C-9) Controlling the amount of combustible fluid being delivered to the vent gas stream so as to provide sufficient reactants for catalytic oxidation to maintain suitable reaction temperatures in the range from 200° C. to 600° C. for the catalytic oxidation to form an oxidation effluent stream comprising unreacted dioxygen, carbon dioxide, water, hydrogen bromide and/or bromine;

(D-9) Cooling the oxidation effluent stream from the catalytic oxidation by passing, simultaneously, the oxidation effluent stream and untreated vent gas stream through a gas to gas exchanger to transfer heat therebetween; and (E-9) Contacting the cooled oxidation effluent gas stream with an aqueous medium comprising at least one member of the group consisting of lime, ammonia, sodium formate, sodium oxalate, sodium sulfide, urea and formaldehyde in a gas scrubbing tower to form a liquid solution of soluble compounds and a treated vent gas stream.

10. The process according to claim 9 wherein the aqueous medium has values of pH in a range from 7 to 9.

11. The process according to claim 10 wherein the solid oxidation catalyst comprises titania and optionally at least one member of the group consisting of tungsten oxide, vanadium oxide, tin oxide, and the metals platinum, palladium and rhodium.

12. The process according to claim 11 wherein the catalytic oxidation is carried out at pressures in a range from about 10 to about 200 psig, and space velocities in a range from 1000 hr$^{-1}$ to 50,000 hr$^{-1}$ based upon gas flow rate at standard conditions and volume of catalyst.

13. The process according to claim 11 wherein 95 percent or more of the carbon monoxide, 90 percent or more of the hydrocarbons, and 85 percent or more of the alkyl bromides in the vent gas stream.

14. The process according to claim 10 wherein the aqueous medium comprises at least one member of the group consisting of sodium formate, sodium oxalate, sodium hydroxide, sodium sulfide, urea and formaldehyde.

15. The process according to claim 9 wherein the combustible fluid comprises at least one member of the group consisting of hydrogen, methanol and butane.

16. The process according to claim 9 wherein the silica, alpha alumina, titania, silica alumina, zirconia and/or gamma alumina is deposited on a ceramic or metallic honeycomb support.

17. A process for abatement of volatile chemical emissions from an industrial unit which forms an aromatic acid from a corresponding methyl substituted aromatic compound by catalytic liquid-phase oxidation of the methyl groups with excess dioxygen in the presence of a source of bromine, the process comprising:

(A-17) Dispersing a combustible fluid selected from the group consisting of carbon monoxide, hydrogen, methanol, butane and mixtures thereof, into a vent gas stream containing dioxygen, carbon monoxide, hydrocarbons and other organic compounds comprising methyl bromide, at pressures in a range from about 10 to about 300 psig;

(B-17) Oxidizing the combustible fluid and destroying at least 95 percent or more of the carbon monoxide, 90 percent or more of the hydrocarbons, and 85 percent or more of the methyl bromide in the vent gas stream in the presence of a solid oxidation catalyst which comprises titania and at least one member of the group consisting of tungsten oxide, vanadium oxide, tin oxide, and the metals platinum, palladium and rhodium, (C-17) Controlling the amount of combustible fluid being delivered to the vent gas stream so as to provide sufficient reactants for catalytic oxidation to maintain suitable reaction temperatures in the range from 200° C. to 600° C. for the catalytic oxidation to form an oxidation effluent stream comprising unreacted dioxygen, carbon dioxide, water, hydrogen bromide and/or dibromine;

(D-17) Cooling the oxidation effluent stream from the catalytic oxidation by passing, simultaneously, the oxidation effluent stream and untreated vent gas stream through a gas to gas exchanger to transfer heat therebetween; and (E-17) Contacting the cooled oxidation effluent gas stream with an aqueous medium comprising at least one member of the group consisting of sodium formate, sodium oxalate, sodium sulfide, urea and formaldehyde in a gas scrubbing tower to form a liquid solution of soluble compounds and a treated vent gas stream.

18. The process according to claim 17 wherein the catalytic oxidation is carried out at pressures in a range from about 10 to about 200 psig, and space velocities in a range from 1000 hr$^{-1}$ to 50,000 hr$^{-1}$ based upon gas flow rate at standard conditions and volume of catalyst.

19. The process according to claim 18 wherein the aqueous medium has values of pH in a range from 7 to 9 and wherein the aqueous medium comprises at least one member of the group consisting of sodium formate, sodium oxalate, and sodium hydroxide.

20. The vent gas treatment process according to claim 19 wherein the titania is deposited on a ceramic or metallic honeycomb support.

* * * * *